(12) United States Patent
Kirita et al.

(10) Patent No.: US 11,099,957 B2
(45) Date of Patent: Aug. 24, 2021

(54) HARDWARE AND DRIVER VALIDATION

(71) Applicant: Microsoft Technology Licensing, LLC, Redmond, WA (US)

(72) Inventors: George A. Kirita, Redmond, WA (US); Sandeep Fotedar, Redmond, WA (US); Yuen-Chen D. Chang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 102 days.

(21) Appl. No.: 16/529,673

(22) Filed: Aug. 1, 2019

(65) Prior Publication Data
US 2021/0034487 A1 Feb. 4, 2021

(51) Int. Cl.
*G06F 11/22* (2006.01)
*G06F 11/263* (2006.01)

(52) U.S. Cl.
CPC ...... *G06F 11/2205* (2013.01); *G06F 11/2294* (2013.01); *G06F 11/263* (2013.01)

(58) Field of Classification Search
CPC ............. G06F 11/2221; G06F 11/2205; G06F 11/2294; G06F 11/263; G06F 11/3688; G06F 11/3692
See application file for complete search history.

(56) References Cited

U.S. PATENT DOCUMENTS

| 7,640,423 B2 * | 12/2009 | Troan | G06F 11/3688 713/1 |
| 9,031,548 B2 * | 5/2015 | Mao | G06F 11/3692 455/418 |
| 9,244,821 B2 * | 1/2016 | Eljuse | G06F 11/3684 |

* cited by examiner

*Primary Examiner* — Joseph R Kudirka

(57) ABSTRACT

Compatibility testing systems and methods are disclosed that provide scalable validation testing of systems and devices. In examples, systems and devices are identified to provide fundamental information about driver operations and driver extensions functionality. The identification allows systems and devices having particular similarities to be grouped in object groups. Compatibility tests are tagged as corresponding to the identifiable systems, devices, and/or object groups, compatibility testing system and methods map test sets specifically tailored to systems and devices as identified by their driver operations and driver extensions functionality. The tailored test sets include tests that ensure compatibility and through optimized test-to-device target mapping, an optimal set of testing set is discovered and scheduled to run. Strategically controlling the amount of testing distributed and executed increases compatibility testing speed and scalability.

20 Claims, 6 Drawing Sheets

HARDWARE AND DRIVER VALIDATION

BACKGROUND

Computer systems and devices are typically designed for compatibility with one or more popular platforms or operating standards (e.g., WINDOWS®, APPLE®, MACOS®, OS X®, ANDROID®, GOOGLE CO-OP®, 3G, Long Term Evolution (LTE), Internet of Things (IoT), wireless fidelity (WiFi), WIFI CERTIFIED® and/or the like). Compatibility with one or more platforms and/or operating standards increases the market share for the item and identifies to the public that certain functionality can be expected. Certification programs determine and confirm that an item satisfies criteria of the platform and/or operating standard. Once an item is confirmed as satisfying the criteria, the item may be certified as being compatible with the platform and/or operating standard.

As technology grows and additional computing options are developed, desktop-based certification programs are becoming inefficient and arduous. In some examples, testing has become unnecessarily redundant, the processing power of testing computers is being wasted, the communication of tests and results are causing network congestions and memory shortages, personal expenses are becoming prohibitively expensive, and the timeline for bringing a product to market is costing time, money, and competitive edge. Traditional certification systems and methods are not scalable.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Examples herein provide compatibility testing. An example includes receiving information describing one or more devices of a client system. Based on at least some of the received information, an object identifier of at least one device of the client system is determined. Based at least on object identifier of at least one device of the client system, the at least one device of the client system is selected for compatibility testing. In response to the selection, a set of tests is mapped from a plurality of compatibility tests based on one or more of the compatibility tests identifying the at least one selected device. The set of tests is distributed to the client system for execution by a device thereof. For example, a single test can be distributed to schedule on a random machine with the same/similar properties that imply a similar device identity.

Many of the attendant features will be more readily appreciated as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1, 2, and 6, the systems and apparatus are illustrated as schematic drawings. The drawings may not be to scale. In FIGS. 3-5, the processes may be performed by features illustrated in FIGS. 1, 2, and 6.

DETAILED DESCRIPTION

Figure 1:
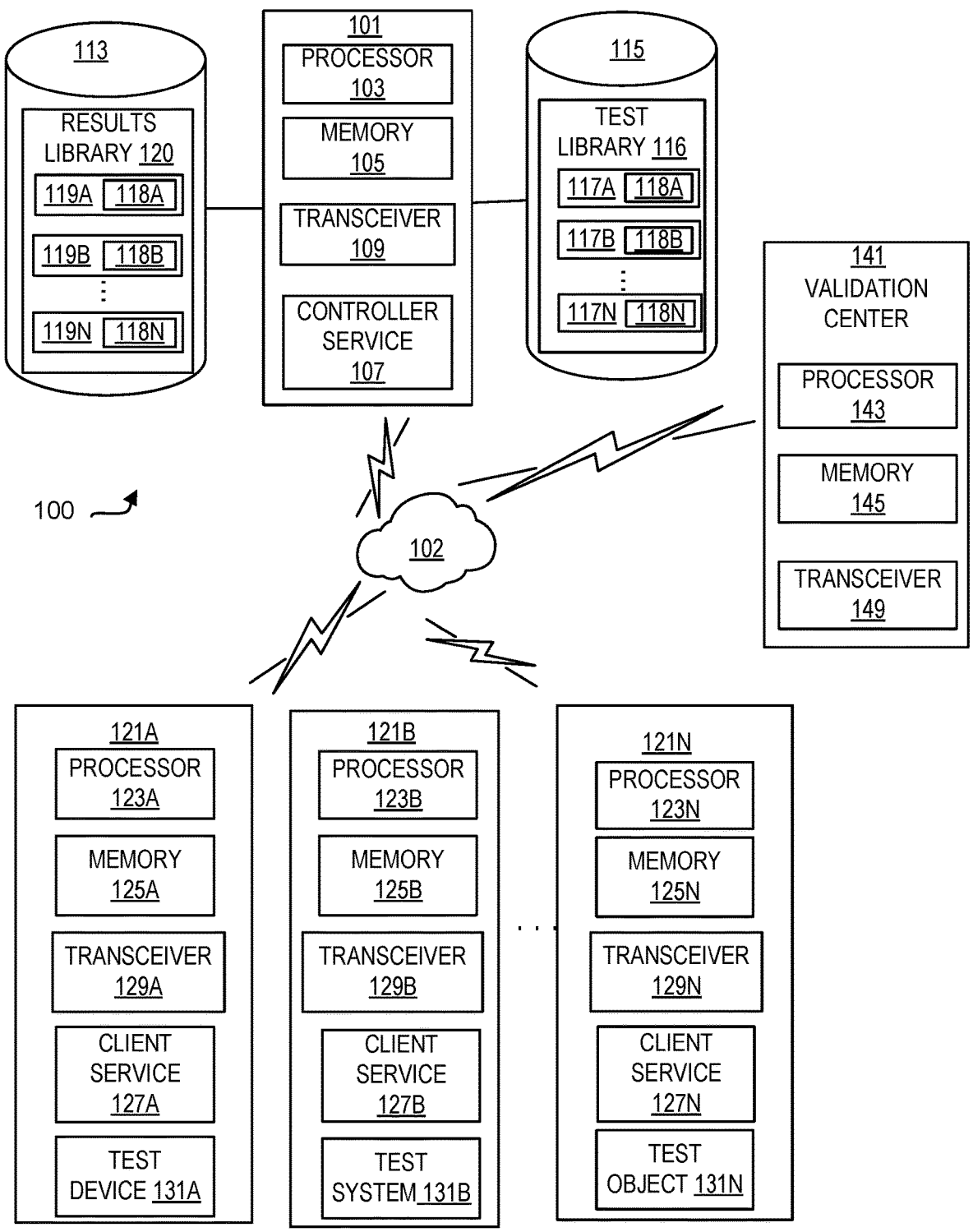
FIG. 1 is an exemplary block diagram illustrating a distributed system configured to provide compatibility testing.

Aspects of the disclosure provide for compatibility testing of various devices and systems in a distributed environment. In examples, independent hardware vendors (IHVs) are companies that design, manufacture, and/or sell computer equipment, accessories, components, and/or peripherals that integrate into computer systems (e.g., desktops, laptops, computer gaming consoles, mobile phones, tablets, and the like). For the purposes of this disclosure, such computer equipment will be called devices. Example devices include, but are not limited to, disk controllers, graphics cards, memory cards, monitors, printers, sound cards, speakers, credit card readers, and/or the like. IHVs often specialize in niche hardware that provides specific improvements to a larger computer system.

Computer systems combine one or more devices into a computer system, for example, personal computers (e.g., desktops) and closed form-factor devices (e.g., mobile phones, tablets, cameras, and/or the like). Computer systems are typically designed, manufactured, and/or sold by original equipment manufacturers (OEMs), original design manufacturers (ODMs), and/or the like. For the purposes of this disclosure, OEM and ODM are used interchangeably. Often, IHVs work within the specifications of popular computer systems to ensure that the hardware functions seamlessly with popular computer system environments. This wide range of compatibility allows IHVs to sell their products to a variety of purchasers and increase their market share. For the purposes of this disclosure, computer systems and closed form-factors of OEMs may be referred to as computer systems.

Further, IHVs and OEMs, alone or together, may work with the specifications of popular software and/or networking specifications to ensure the devices and computer systems function seamlessly with popular software operating systems, operating standards, and/or networking systems. Much of the disclosure herein discusses devices and computer systems in terms of hardware to make the description easier to understand. However, all systems and methods disclosed herein may also be performed by or in applications, software, firmware, operating systems, and/or the like.

Devices are supported by drivers that are configured to cause hardware of the device to operate as intended. In examples, device drivers may be configured to operate within one or more computer systems. Based on this configured compatibility between devices and computer systems, examples disclosed herein leverage this purposeful compatibility to improve compatibility testing for compatibility validation purposes, as compared to conventional compatibility testing. Improvements over conventional compatibility testing and improvements of the functionality of the testing computers that perform compatibility testing is realized at least by reducing redundant testing. As compared to conventional testing computers, reducing testing redundancy allows devices and computer systems to be tested more quickly, at less personnel costs, at less computer processing costs, and with less testing results.

Further, systems and methods herein improve the functionality of the testing computers that perform compatibility testing within a distributed environment at least by reducing the amount of tests distributed to one or more client side testing computers, as compared to conventional testing environments. Reducing the amount of tests distributed to one or more client side testing computers reduces network congestion and reduces storage difficulties experienced by distributing computers and test receiving computers. Further still, systems and methods herein improve the functionality of the validation computers that process compatibility testing results to perform compatibility validation. Improvements over conventional systems and methods are realized at least by reducing the redundancy of compatibility test results. Reducing compatibility test results allows validation computers to perform the same quality of validation from smaller results packages. These smaller results packages reduce network congestion and storage difficulties. Further, utilizing smaller results packages speeds up validation processing with less personnel costs and less computer processing costs thereby increasing efficiency.

Aspects of the disclosure operate in an unconventional way by providing distributable compatibility tests. A distributable compatibility test is designed to test the compatibility of more than one type of device and/or computer system. If a test is tagged as distributable, then the distributable test may not be duplicated when devices and/or computer systems undergo compatibility validation. As such, providing distributable compatibility tests reduces testing redundancy and reduces test results redundancy. Further, providing distributable compatibility tests provide a practical solution to conventional testing that has become unnecessarily redundant, wasteful of processing power, caused network congestions and memory shortages, and prohibitively expensive personal expenses. Moreover, systems and methods herein provide a practical application, which reduces the timeline for bringing a product to market and advances designer's competitive edge.

Aspects of the disclosure further operate in an unconventional way using a controller that selectively maps tests for similar devices to minimize testing, distributes and deploys the tests on a related device, and then intelligently merges test results for validation, without having to run separate tests for all the devices. The disclosure also supports extension driver testing, further reducing the quantity of tests to be run.

In some examples, validation includes both certification and co-engineering. Co-engineering occurs when two companies or entities collaborate on a project, such as to ensure compatibility of a driver.

FIG. 1 is an exemplary block diagram illustrating a distributed system 100 configured to provide compatibility testing. Distributed system 100 includes any number of nodes that communicate via one or more communications networks 102 (e.g., the Internet). Example server node 101 (e.g., server) includes one or more memories 105 coupled to one or more processors 103 configured to execute software thereon. Server node 101 communicates with network 102 via one or more transceivers 109. Distributed system 100 may include any number of server nodes. Server node 101 includes controller service 107, which is locally and/or remotely coupled to one or more memories (e.g., databases 113 and 115).

In examples, database 115 stores one or more test libraries 116. In examples, a test library may correspond to a specific operating standard and include tests corresponding thereto. A test library 116 may be dynamic in that tests may be added, removed, and/or modified at any time.

An example test library 116 includes one or more tests (117a-117n) that assess whether the hardware, driver, and/or functionality of a computer system and/or device is compatible with a specific operating standard. In examples, a test may be called a compatibility test. One or more tests may be designed to test a single particular device or system. One or more tests may be designed to test a plurality of particular devices and/or systems. Tests 117a-117n may include one or more indicators (e.g., tag 118) that conveys information about the test. Indicators are not limited to tags; additionally and/or alternatively, example indicators may include, but are not limited to, keywords, terms, classifiers, bookmarks, identifiers, labels, flags, stamps, marks, categories, indexes, titles, hashtags, designators, and/or the like. In an example, tags may be included in metadata of a test. A tag conveys information about the test. In examples, a tag of a test may represent a combination of device feature attributes, OS platform attributes, platform family distribution attributes, and the like. Further, a tag of a test may indicate which one or more target systems and/or devices the test is designed to test; a tag of a test may indicate which one or more operating standards for which the tests are designated to test; the tag of a test may indicate whether the test is run once per system or rerun multiple times per system; a tag may indicate whether the test is distributable, and/or the like.

A target is a type of system and/or device. Example targets include memory devices, graphics cards, audio cards, desktops, cameras, mobile phones, tablets, and/or any other type of system or device. In examples, a single tag 118 may be used to indicate multiple targets; a tag 118 may indicate a single target; and/or a tag 118 may indicate that one or more tests correspond to each other under one or more conditions. A test may include any number of tags, and tags of a test may be added, deleted, and/or manipulated, as desired. In examples, an author of a test establishes the tag and/or tags of the test. Controller service 107 may use tags for mapping and/or tracking. Tags may be used by controller service 107 to determine which tests to distribute to which systems and/or devices. Additionally and/or alternatively, tags may be used to map related tests with each other based on parameters and/or conditions; tags may be used to organize the storage of tests within one or more databases and/or one or more libraries. Tags may be used to track the frequency of a test's usage and may be used to determine whether certain tests should be cached for quick access. Tags may be used to correlate tests having similar characteristics including expiration dates, a type of programming bug and or number of bugs, compatibility passage and failure rates, and/or customer complaints, and in examples, factors such as device feature attributes, OS platform attributes, platform family distribution attribute may be used during the correlating of tests.

In examples, database 113 stores one or more results libraries 120. An example results library 120 includes one or more test results (119a-119n) that were received from tested test objects. In examples, a results library 120 may comprise compatibility results that correspond to a specific operating standard. A results library 120 may be dynamic in that results may be added, removed, and/or modified at any time.

Example controller service 107 may also be locally and/or remotely coupled to one or more memories (e.g., database 115) storing one or more test results 119a-119n. A test result includes an outcome caused by executing a compatibility test on a device or system. Results 119a-119n may be tagged, or otherwise indicate, information about the system and/or device that was tested (e.g., test object) and/or the object group to which the result applies. In examples, a uniquely identified system or device may be referred to as a test object. A test object is distinguishable from a target, because a test object is a uniquely identified system or device, while a target describes a type of system or device. For example, a target may be random access memory (RAM) generally, while a test object may be a unique RAM designed and produced by a uniquely identified IHV.

As described herein, 'unique' means unique among other elements. For example, a unique device is unique among other devices, a unique IHV is unique among other IHVs, etc.

Results 119a-119n may include additional tags indicating additional information, for example, identifying which test was used to cause the result. Controller service 107 may use tags of tests 117a-117n and/or results 119a-119n for mapping and/or tracking.

Distributed system 100 includes one or more client nodes (121a-121n). Client nodes (121a-121n) may be local and/or remote to each other. Client nodes (121a-121n) may communicate with server node 101 and/or each other via one or more networks 102 (e.g. Internet). Client nodes may be affiliated or not be affiliated with each other. Example client nodes (121a-121n) include one or more memories (125a-125n) coupled to one or more processors (123a-123n) configured to execute software stored on their respective memory. Client nodes (121a-121n) communicate with network 102 via one or more transceivers (129a-129n). Distributed system 100 may include any number of client nodes. Client nodes (121a-121n) include client services (127a-127n), which are locally and/or remotely coupled to one or more systems and/or devices that will be tested (e.g., test device 131a, test system 131b, object 131n). An example test object is an object that is tested for compatibility. Example objects include devices and computer systems.

Distributed system 100 is in communication with one or more validation centers 141, which may be local and/or remote from each other. An example validation center 141 may communicate with one or more server nodes 101, one or more client nodes 121a-121n, and/or other validation centers, via one or more networks 102. An example validation center 141 includes one or more memories 145 coupled to one or more processors 143 configured to execute software stored thereon. Validation center 141 communicates with network 102 via one or more transceivers 149. Distributed system 100 may include any number of validation centers.

Figure 2:
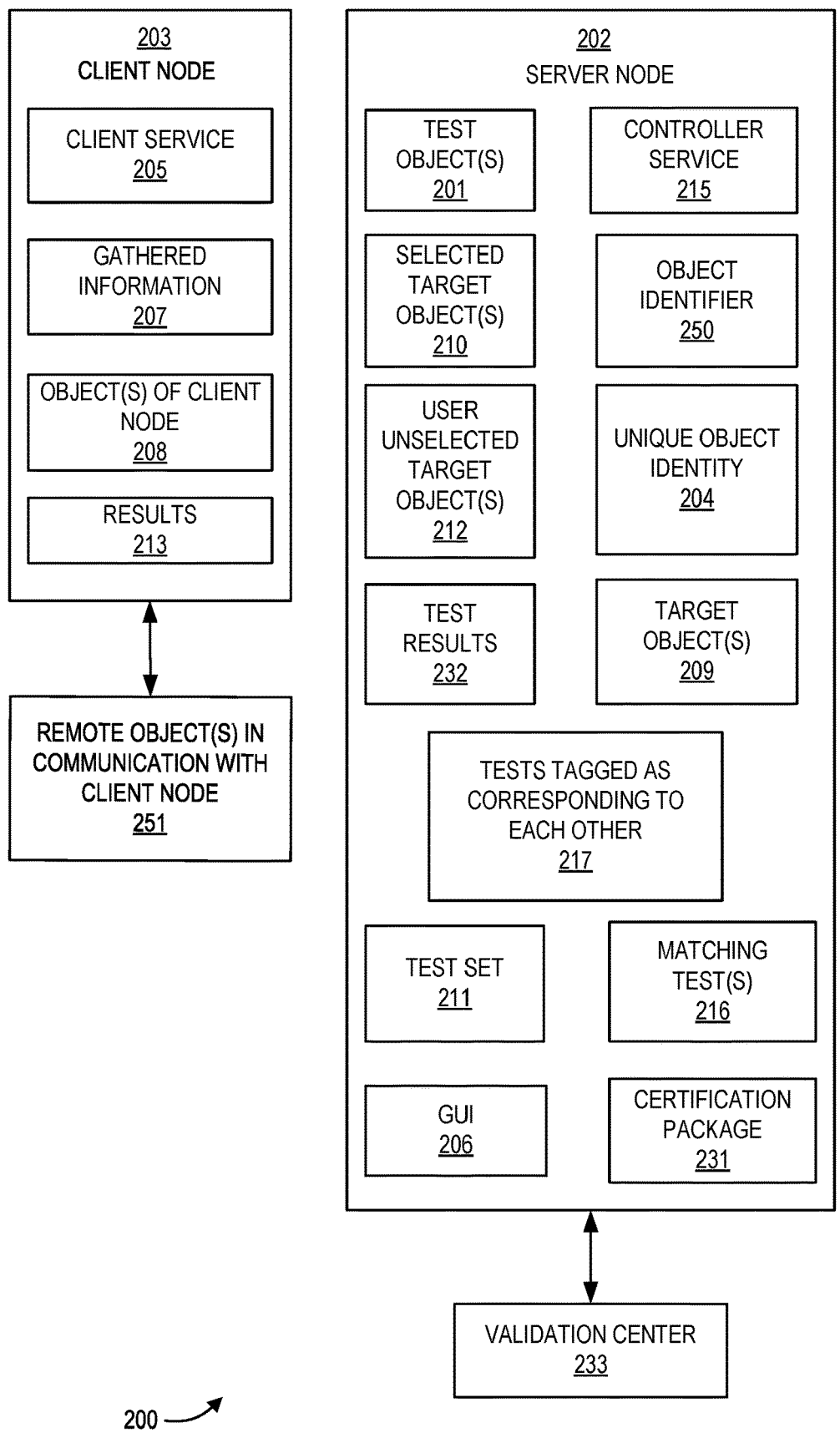
FIG. 2 is an exemplary block diagram illustrating a distributed system configured to provide compatibility testing.

FIG. 2 is another exemplary block diagram illustrating a distributed system 200 configured to provide compatibility testing. Distributed system 200 includes client node 203, which may include some or all features of client node 121 described above. A processor of client node 203 presents a graphical user interface (GUI) 206 presents information to a user and received user input for user communication with client node 203 and any component thereof and/or coupled thereto. Client node 203 includes one or more object(s) 208.

Object 208 is a system and/or device. Client node 203 may be in communication with one or more remote object(s) 251. Remote object 251 is a system or device. Client node 203 also includes and/or communicates with a client service 205. In examples, client service 205 may be an application stored in memory and executed by one or more processors of client node 203. In further examples, client service 205 may be accessed via a web interface. As illustrated in FIG. 1, any number of client nodes may be included within distributed system 200, and client nodes may be dynamically added, deleted, modified, and/or the like at any time.

Any number of client nodes (e.g., client node 203) communicate with server node 202, which may be remotely located from one or more client nodes. Any number of server nodes may be included within distributed system 200, and server nodes may be dynamically added, deleted, modified, and/or the like at any time. Example server node 202 includes a controller service 215 that communicates with client service 205 and may cooperatively assist with the compatibility testing of one or more objects 208 and/or one or more remote objects 251. In examples, sever node 202 hosts a web interface for client service 205 and/or sends client service 205 application data to client node 203 for execution thereon.

Client service 205 gathers information, and in examples, gathers information about hardware and/or software of client node 203, objects 208, remote objects 251, and/or systems and/or devices of client node 203. Gathered information 207 may assist with determining the identity of objects 208, systems and/or devices related to objects 208, remote objects 251, client node 203 itself, as well as users thereof. Examples of gathered information 207 includes, but is not limited to, hardware identifiers (HWIDs), peripheral component interconnection (PCI) information, operation system and the version or edition thereof, driver information, device feature information, system feature information, a set up information file (e.g., INF file), any information within a set up information file (e.g., driver name, driver location, driver version or edition information, registry information, etc.), extension file information (e.g., EXT file), brand support information, family platform information, software identification information, application programming interface (API) information, projects identifications, and/or the like. Additional examples of gathered information are provided below in the description of FIG. 4 and in the Additional Example Scenarios. described below. Some or all of gathered information 207 may be sent by client node 203 and received by server node 202 in one or more data communications (e.g., data packets).

Controller service 215 receives some or all of gathered information 207 from client node 203. In examples, client service 205, controller service 215 and/or object identifier 250 use at least some or all of gathered information 207 to determine a unique object identity 204 of some or all objects 208, a unique object identity 204 of client node 203, and/or a unique object identity 204 of one or more systems and/or devices in communication with client node 203. In examples, one or more unique object identities 204 of systems and/or devices associated with client node 203 is included within gathered information 207. In examples, one or more unique object identities 204 is stored in a memory accessible by server node 202 such that controller service 215 may compare gathered information 207 with one or more unique object identities 204 stored in the memory to determine one or more unique object identities 204 of systems and/or devices associated with client node 203.

Figure 4:
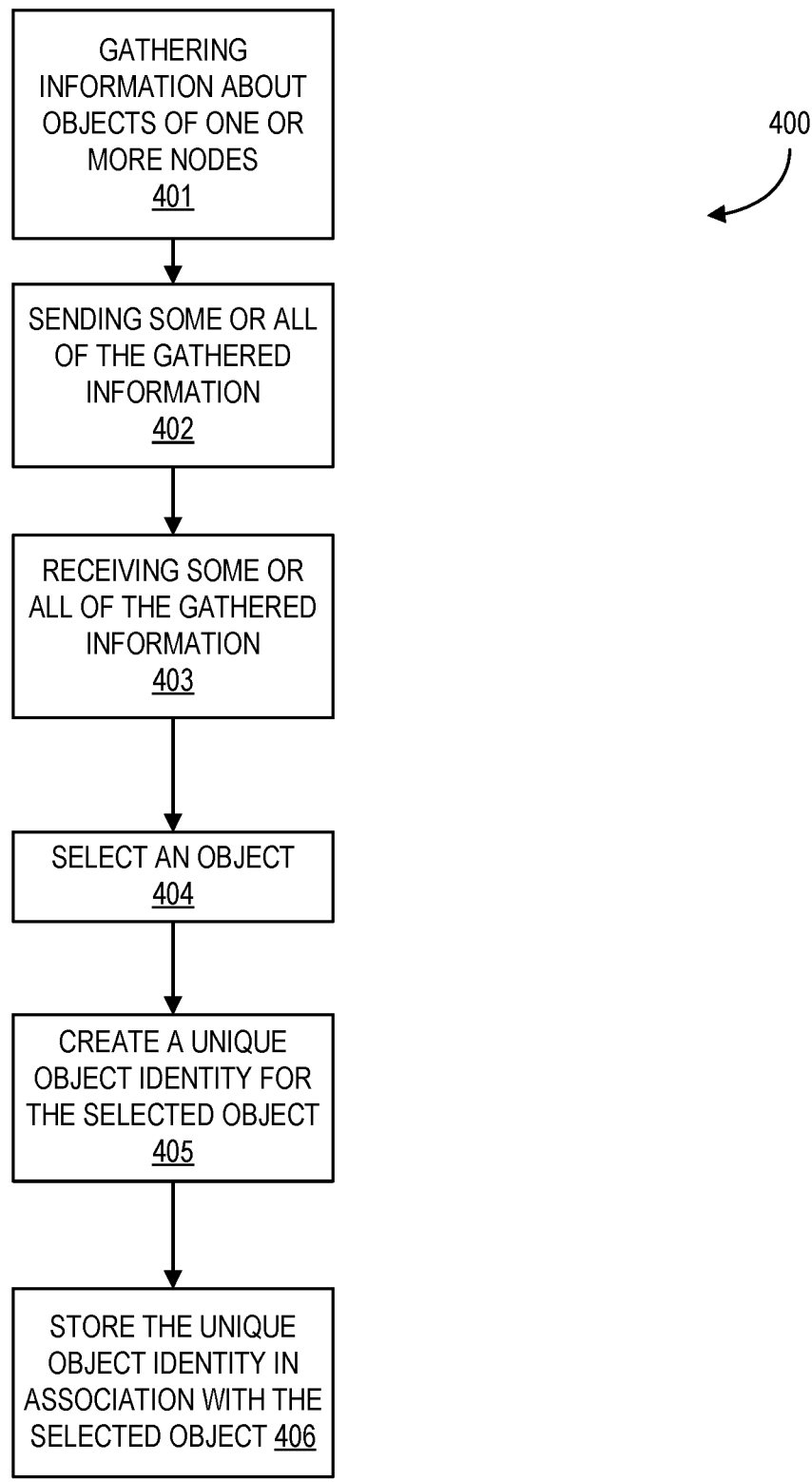
FIG. 4 is an exemplary flow chart illustrating a method of uniquely identifying systems and/or devices.

Sometimes, a unique object identity 204 has not yet been created for one or more systems and/or devices associated with client node 203. In examples where a unique object identity 204 has not yet been created for one or more systems and/or devices associated with client node 203, systems and methods described herein create a unique object identity 204 for one or more systems and/or devices associated with client node 203. FIG. 4, explained in detail below, describes an example method 400 that systems disclosed herein may use to create a unique object identity 204. After a unique object identity 204 is created for an object, the unique object identity 204 is stored, for example, by the object, by server node, in a memory accessible by server node, and/or the like.

controller service 215 determines whether one or more objects 201 of client node 203 qualifies as a target object 209. A target object 209 is an object 201 for which one or more compatibility tests may be available. To determine whether an object 201202 is a target object 209, controller service 215 may compare the unique object identity 204 of an object 201 to information provided in tags 118 of compatibility tests 117. If one or more compatibility tests includes one or more tags indicating that a compatibility test is designed for object 201, testing controller service 215 determines test object 201 is a target object 209. In examples, controller service 215 may search tags of compatibility tests stored in a testing library using unique object identities 204 in order to determine whether any compatibility tests are directed to any test objects 201202 and identify the target objects.

The identified one or more target objects 209 may be disclosed to client node 203. For example, server node 202 sends one or more communications (e.g., data packets) indicating one or more target objects 209 available at client node 203. GUI 206 may present a hierarchy and include information about one or more target objects 209 available for testing. In examples, the server node 202 performs the selection of the one or more target objects 209 of a client node 203 for testing, and the client node is unaware of the selection process.

Alternatively, a client node 203 may selection capabilities and/or limited selection capabilities, wherein the controller service 215 displays GUI 206 having a selectable list of target objects 209. The hierarchy and information may assist a user decide, which target objects 209 may be desirable for compatibility testing at that time. Using GUI 206, a user may select one or more of the target objects 209 for testing, for example by clicking on icons, checking one or more boxes, and other otherwise indicating user the selections to GUI 206. If a client node has selection capabilities, upon a target object 209 being selected for compatibility testing, the target object 209 becomes a selected target object 210. Further, if a target object 209 is not selected for testing, the target object 209 is considered an unselected target object 212. A target object 209 may become an unselected target object 212 incidentally or purposefully. Non-selection may be indicated by a failure to indicate selection a target object 209 from a list of options presented by the GUI and/or by purposeful selection a preclusion option. In examples, the selection process may be fully and/or partially automated. In a hierarchy example, if a user selects a target object 209 at a level of a hierarchy, then target objects 209 classified beneath the user selected target object 210 may automatically be selected for testing without user input. In another hierarchy example, if a user fails to select or precludes a target object 209 at a level of a hierarchy, then target objects 209 classified below the user unselected target object 212 may automatically be considered user unselected target objects 212. The automatic selection and/or non-selection of target objects 209, for example in a hierarchy example, may be overridable by in GUI 206 or may not be overridable in GUI 206, as is desired.

In examples, the user selection option is performed at the initial project creation stage. Thereafter, the server node 202 may perform the selection of the one or more target objects 209 of a client node 203 for testing with the client node being unaware of the selection process.

Server node 202 receives from the client node 203 indications of which target objects 209 are selected target objects 210 and which are user unselected target objects 212. In examples, server node 202 may derive selection and/or unselection inferences from the received information. Controller service 215 may consider the indicated selected target objects 210 and user unselected target objects 212 as factors when mapping a test set 211 for client node 203. For example, controller service 215 may map a selected target object 210 to tags of compatibility tests. If a compatibility test's tag matches a selected target object 210, then controller service 215 identifies the test as a matching compatibility test 216. Further, controller service 215 may identify one or more matching compatibility tests 216 for a selected target object 210. Based on the identified matching, controller service 215 may include one or more matching compatibility tests 216 in the test set 211.

As explained above, a tag of a single test may match one or more systems and/or devices. Sometimes, one or more matching compatibility tests 216 of a first selected target object 210 may be the same as one or more matching compatibility tests 216 of a second selected target object 210. When mapping test set 211, controller service 215 may prevent duplicative matching compatibility tests 216, such that test set 211 includes a single instance of a matching compatibility test 216. Also, unless conditions indicate otherwise, controller service 215 may further cull test set 211 to optimize the test mapping (e.g., increase the reference count to the single instance of compatibility test).

Further still, unique object identities 204 may be used to identity when one or more target objects 209 are the same or similar to each other and/or the same or similar to one or more previously tested objects and may skip some matched compatibility tests 216 from test set 211 based on optimization mapping of the devices' similarities. As explained below with respect to FIG. 4, when a unique object identity 204 is created, the unique object identity 204 includes information that describes the object itself (e.g., drivers of the object, extension drivers of the object, an operating system to which the object communicates, system files of the object and/or the like). Because the unique object identity 204 includes descriptive information about the object that is intuitive to device compatibility, controller service 215 may identity when one or more target objects 209 are the same or similar to each other. Controller service 215 may also identify when one or more target objects 209 are the same or similar to previously tested objects (e.g., two similar audio devices being tested on different hardware platforms). Based on controller service's 215 determination that target objects are the same or similar, controller service 215 may optimize compatibility testing of matched compatibility tests 216 determined to be duplicative due to the target devices' sameness or similarities. Further, if controller service 215 determines that a same device or similar device has already undergone compatibility testing, controller service 215 may optimize test mapping to increase the reference link to the single instance of compatibility test.

By identifying and purposefully mapping tests in an optimized way that skips duplicative testing and/or tests dedicated to user unselected target objects 212 from the test set 211, controller service 215 optimizes the test mapping and intelligently limits the inclusion of superfluous tests to purposefully solve the unsustainable amount of testing redundancy and testing results redundancy making conventional systems unscalable.

More example factors controller service 215 may consider while mapping the test set 211 include any additional information indicated in tags of matched compatibility tests 216. As explained above, some tests may be tagged as corresponding to each other 217. Further, tags may indicate conditions such that one or more tests correspond to each other upon the satisfaction of one or more conditions. When conditions are indicated, if controller service 215 determines that the one or more conditions are satisfied, then those tests tagged as corresponding to each other 217 may also be included in test set 211.

Any number of conditions may be defined by tags, for example, the presence or absence of hardware and/or software of client node 203, expiration times, distributable indicators (detailed further herein), the presence or absence of applicable previous test results, and/or the like. An example condition may be based on whether client node 203 includes a particular system and/or device. If a test's tag is conditioned on the presence of a particular system and/or device that is absent from target objects 209 of client device 203, then the condition fails, and controller service 215 may map tests such that tags including a failed condition are avoided from the test set 211. Excluding tests from the test set 211 is an improvement over conventional testing systems at least because it reduces the amount of tests within test set 211, which reduces the number of tests executed by client node 203, reduces network congestion, relieves storage capacity at client node 203, and reduces client node's 203 processing expenditures.

In another example, if a test's tag is conditioned on the presence of a particular system and/or device that matches a target object 209 of client device 203, then the condition is satisfied, and controller service 215 may include that test in the test set 211. Including tests tagged as corresponding to each other 217 provides practical solutions for users of compatibility testing systems while maintaining the system integrity. For example, an IHV using GUI 206 to choose selected target objects 210 is typically focused on testing their specialty product (e.g., speakers designed by the IHV). This particular IHV user may accidently forget about and/or be unaware of one or more additional systems or devices (e.g., USB port, HDMI port, 3.5 mm Tip, Ring, Sleeve (TRS) minijack, etc.) that may be effected when testing the selected target object 210 (e.g., speakers). For robust testing that ensures compatibility quality control, a compatibility testing system may benefit from testing the selected target object 210 as well as additional systems and/or devices that may be affected by the selected target object 210. At least one reason for such thoroughness is that the selected target object 210 (e.g., speaker) may cause an unexpected malfunction in one or more other systems and/or devices (e.g., USB port, HDMI port, 3.5 mm TRS minijack, etc.). These unexpected malfunctions may not be discovered if the IHV were permitted to limit their testing to their selected target object 210 (e.g., speaker).

Conventional compatibility testing systems prevented the above described problem by testing all the systems and all the devices of client node 203. However, as explained above, these conventional systems and methods cause an unsustainable amount of testing redundancy and result tracking redundancy making conventional systems and methods unscalable at least because upgrades and/or changes to a system or device at client node 203 causes all the systems and all the devices to be retested again. In contrast, the compatibility testing described herein, which uses tests tagged as corresponding to each other 217, which includes one or more conditions at times, it particularly helpful and practical in testing facilities. It allows a testing facility to prevent a substantial amount of redundant testing and instead focus on selected target objects 210, while at the same time protecting compatibility quality control by having controller service 215 determine whether one or more additional tests may be beneficial to include in the test set 211 without demanding that all the compatibility tests be consistently run redundantly.

Additional example tag defined conditions involve existing results (119A-119N) stored in one or more results libraries 120. The existing results may include tags that indicate information about the test which caused the result, the unique object identify of the object tested, the object groups to which the result applies, expiration dates, testing conditions, and/or the like. If a compatibility test's tag indicates that a corresponding existing results may be relied upon for the selected target object 210, controller service 215 may choose to cull these tests from the test set 211 to avoid testing selected target objects for which sufficient results already exist. The tag's condition may indicate that the existing result may be used instead of the test when the unique object identity of the selected target object matches the result and/or when the unique object identity of the selected target object matches the object group of the result.

Controller service 215 maps an optimized test set 211 for client node 203 from the test library 116. The test set 211 is optimized because it may include one or more tests that a particular operating standard identifies as being desirable for testing selected target objects 210, may include one or more tests identified as being desirable for testing user unselected target objects 212, may cull tests that are identified as being unrelated to selected target objects 210, may cull tests that are identified as being unrelated to user unselected target objects 212, may cull tests that are not related to the desired operating standard, may identify an object group including a plurality of similar devices and limit testing to one or two of those similar devices to prevent superfluous redundant testing, may decide to test similar devices of an object group when it is determined that such redundant testing is useful, may cull tests and instead use previous results corresponding to the culled tests in order to reduce the test set, and/or otherwise avoids mapping tests identified as being unproductive or lacking efficacy for any particular testing request.

The test set 211 are received by client service 205 in one or more communications. A respective test of the test set 211 may include one or more tags (or other indicator) indicating which test applies to which test objects 201. The test set 211 may also include sequence information indicating one or more sequences of testing execution. In examples, one or more tests objects 201 may apply to a given device group. Further, sequence information may indicate that one or more tests may execute more than once and may have one or more intervening tests between the plurality of executions. One or more tests may run once per test object 201, once on each test object 201, and/or once on every system, as an example.

Client node 203 executes the tests of the test set 211 on one or more objects 208201 and the execution produces outcomes results 213. In examples, more than one result may be grouped into a result set. Each test of the set of tests may cause one or more outcomes of interest and/or results. A result may be an indication of whether hardware, drivers, and/or software of a test object 208 is compatible with a defined operating standard. In examples, one or more results may include a pass indicator, fail indicator, ratio of compatibility indication, reasons for compatibility, reasons for incompatibility, suggestions for improvements, and/or the like. One or more results may be tagged with the unique object identity 204 of the object 208, an object group to which the test object belongs, time and date of testing, client node information, and other information describing testing conditions.

Some or all results may be included in a set of results 213. The set of results 213 may also include information reporting test sequence information, result sequence information, and/or user failure or perceived intervention. Further, if results of more than one test object 201 is included in the set of results 213, the set of results 213 may indicate which results correspond to which test object 201 and whether one or more results are contingent on another one or more other results.

The set of results 213 may be sent to controller service 215. In examples, results of the set of results 213 may be tagged with any of the indications described above and stored in results library 120. Tags of a result and/or set of results 213 may further indicate the client node source of the results, date of the results, a trigger causing the results to expire, deleted, and/or initiate replacement, a unique object identification of the test object, a platform and/or platform family identification, and/or the like. Results received by controller service 215 may be referred to as test results 232.

Controller service 215 may receive a request for a validation package. In examples, the request may be received from a client node 203, from an affiliate client node, and/or from a validation center 233. In other examples, the request may be a trigger based on factors, for example, controller service 215 determining a sufficient compilation of information (e.g., received results) have been obtained from one or more client nodes such that a validation package can be created. Further, users of one or more client nodes may set up a testing project such that results are received from various client nodes over a period time, and upon expiration of the time and/or receipt of the expected results, the testing project's policies trigger the request.

In examples, controller service 215 creates a certification package 231 by selecting and merging one or more results from one or more sets of results. In examples, controller service 215 gathers a group of results that correspond to each other. In examples, results including corresponding tags may be gathered together. For example, if certification is based on a testing project, results tagged with the project identification may be gathered. In examples, results tagged with a unique object identity 204 that is related and/or determined to be within a same platform family may be gathered together. As detailed above, some compatibility test's tag indicates that a corresponding existing results may be relied upon for a selected target object 210, and sometimes controller service 215 culls these tests from a test set 211 to avoid testing selected target objects for which sufficient results already exist. In such an example, the corresponding existing results that the controller service 215 relied upon when deciding to cull a compatibility test will be gathered for the selection process. Further, results tagged as being similar to each other may also be gathered together.

Controller service 215 selects results from the gathered results. Various policies may be implemented by a specific operating standard (e.g., WINDOWS®, IOS®, ANDROID®) for selecting from gathered results. For example, a policy may indicate one result is selected from a plurality of results tagged with the same unique object identifier, while the others are discarded. When choosing which one result to select and which other to discard, the policies may consider the results a pass indicator, fail indicator, ratio of compatibility indication, reasons for compatibility, reasons for incompatibility, suggestions for improvements, time and date of testing, client node information, and other information describing testing conditions of the result. Another example policy may indicate that based on certain conditions, two or more results are selected from a plurality of results tagged with the same unique object identifier. In an example where previously existing results were relied upon by the controller service 215 when deciding to cull an otherwise useful compatibility test may be selected. Other conditions include results produced from tests that are tagged for re-running.

Controller service 215 takes the selected results and merges them into a validation package 231. In examples, one or more drivers (e.g., a driver) are also merged into the validation package 231. The validation package 231 is sent to a validation center 233. In examples, server node 202 sends the validation package 231 to the validation center 233. In examples, one or more client nodes 203 send the validation package 231 to the validation center 233. After receiving the validation package 231, the validation center 233 validates the accuracy and/or authenticity of the results and/or drivers within the validation package 231. For example, a validation package may be submitted to a MICROSOFT® Development Center (Dev Center) for validation. If the Dev Center validates the validation package, then the systems, devices, and drivers of the validation package are WINDOWS® validated. WINDOWS® In examples, the validated drivers (e.g., driver extensions) can be uploaded to driver update systems which pushes updates to user devices. In further example, validated systems and devices may be validated to be sold as WINDOWS® validated WINDOWS®.

Figure 3:
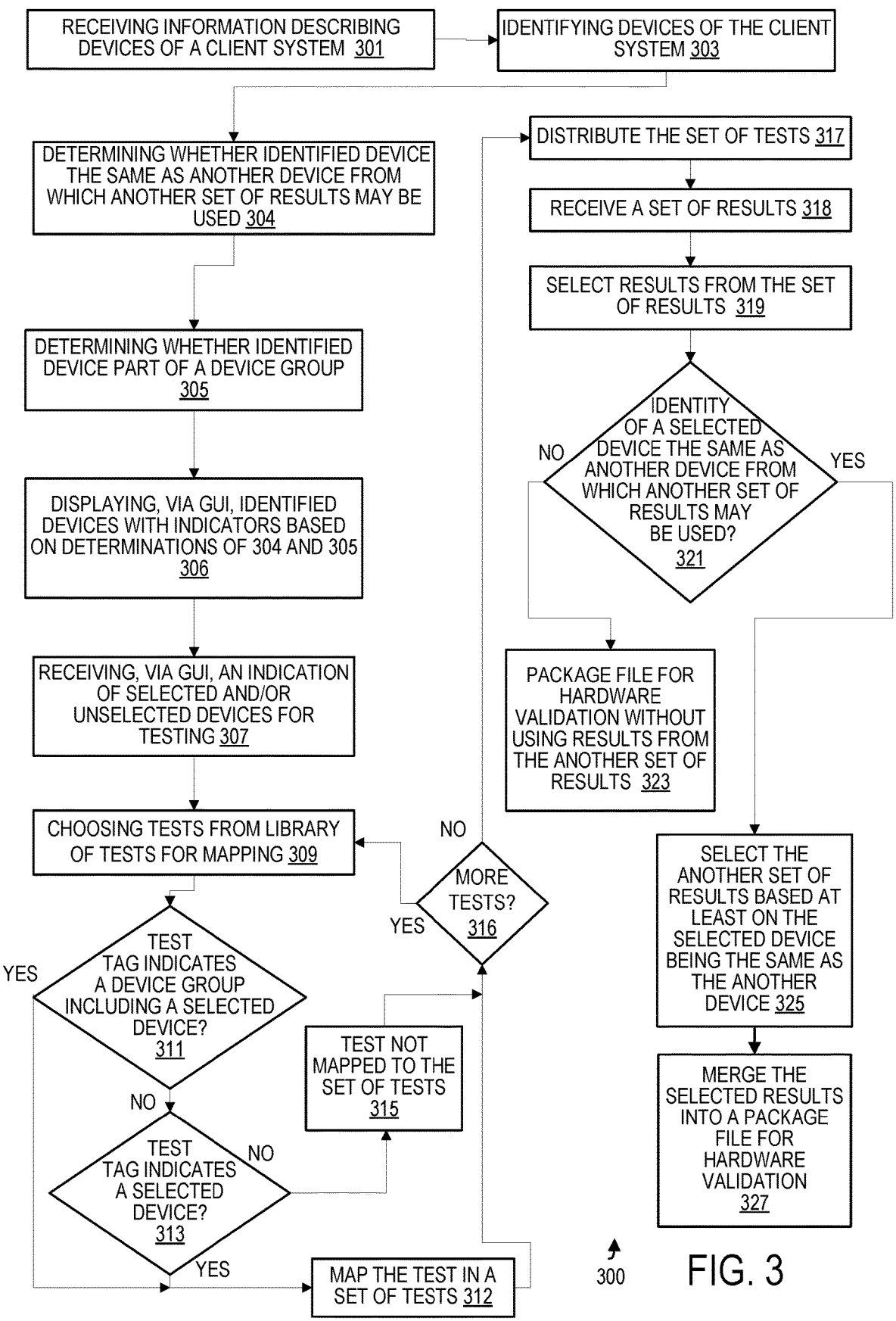
FIG. 3 is an exemplary flow chart illustrating a method of performing compatibility testing in a distributed environment.

FIG. 3 is an exemplary flow chart illustrating a method 300 of performing compatibility testing in a distributed environment. In some examples, the method 300 is performed after the user has opted-in to the workflow; that is, the workflow will not continue until the user has opted-in. At operation 301 a testing controller receives information describing devices of a client system. At operation 303, based on at least a portion of the information, identifying devices of the client system. In examples, the identifying devices do not yet have an assigned unique object identity. Method 300 may jump to operations of method 400, disclosed below, if it is determined that the identifying devices do not yet have an assigned unique object identity. In examples, operation 303 is completed once the testing controller has identified devices of the client system according to a device's unique object identity.

At operation 304, controller service determines whether one or more of the identified devices of the client system (from operation 303) is the same as another device from which test results may be used. The controller service may base this determination on whether one or more of the identified devices of the client system as has the same unique object identity as another device. For example, the client system may include two devices sharing the same unique object identifier. Further, the client system (e.g., 121A) may have a device sharing the same unique object identifier as another device of another client system (e.g., 121B), from which the server node has already received test results.

Further still, the client system (e.g., 121A) may have a device sharing the same unique object identifier as another device of another client system (e.g., 121N), from which one or more server node expects to receive test results. In this way, the distributed environment allows operation 304 to determine whether the identities of the one or more devices of the client system (e.g., 121A) share the same unique object identity as one or more devices from which another set of test results may be used, regardless of the origination of the set of test results (e.g., originating from client system 121A, 121B . . . 121N) and regardless of whether the another set of results have yet been received by server node 101 and/or a different server node, and/or are expected to be received in the future by server node 101 and/or a different server node.

At operation 305, based on the unique object identities of the identified devices, the controller service determines one or more of the identified devices of the client system are part of device groups. An identified device is part of a device group when features of the identified device reach a threshold of similarity with other devices of the device group. For two devices to be considered the same, the actual driver package contents have to be equal. Details of forming device groups and their thresholds are detailed further below.

At operation 306, the server system, via a GUI, displays for selection one or more of identified devices of the client system, for example as determined by operation 303. In examples, if operation 304 determines that one or more devices of the client system (e.g., 121A) share the same unique object identity as one or more devices from which another set of test results may be used, then the GUI may indicate this information. In examples, if operation 304 determines that one or more of the devices of the client system (e.g., 121A) do not share the same unique object identity as one or more devices from which another set of test results may be used, then the GUI may indicate this information. In examples, if operation 305 determines that one or more devices of the client system is part of a device group, then the GUI may indicate this information. In examples, if operation 305 determines that one or more devices of the client system is not part of a device group, then the GUI may indicate this information.

Displaying this information via the GUI may aid a user in selecting devices for testing. For example, if a user sees that an identified device of the client system shares the same unique object identity as one or more devices from which another set of test results may be used, the user may choose to unselect that identified device for the present testing in an effort to save testing time. Further, if desired, the GUI may provide no indications or a culled sets of indications of the outcome of operations 304 and 305.

Via the GUI, at operation 307, a user indicates user selected devices and/or unselecting devices of the identified devices for testing. At operation 309, based at least on user selection, user un-selection, and/or hierarchy information about target objects (described above), controller service chooses tests from one or more test library of tests to map a set of tests for the client system.

When mapping the set of tests, at operation 311 the controller service determines whether a compatibility test from a testing library has a tag indicating correspondence with a device group comprising at least one of the selected devices of the request. If the answer to operation 311 is yes, then the controller service maps the test to the set of tests at operation 312. If, however, the answer to operation 311 is no, the controller service moves to operation 313 to determine whether the compatibility test from the testing library has a tag indicating correspondence at least one of the selected devices of the request. If the answer to operation 313 is yes, then the controller service moves to operation 312, which maps the test to the set of tests at operation 312. If, however, the answer to operation 311 is no, then controller service moves to operation 315, which does not map the compatibility test to the set of tests based at least on information from the tag as compared to information about the selected devices of the request.

At operation 316, the controller service determines whether there are more tests in the library to consider for mapping. If the controller service there are more tests in the testing library, then method 300 moves back to operation 309 and performs operations 309-316 until the controller service determines at operation 316 that all tests (or a subset of all the tests) of the library have been considered for mapping. When controller service has mapped all the tests determined to be desirable in the set of tests, at operation 317, the controller service distributes the set of tests to one or more a client node, wherein the client node executes the tests according to the mapping.

At operation 318, controller service receives a set of results (e.g., set A) from a client node. The set of results is based on outcomes of the set of tests and in examples, the set of results lacks testing outcomes associated with one or selected devices that were identified as being included within a device group. At operation 319, the controller service begins the process of selecting results for inclusion in the package file by selecting which results of the receive results (e.g., set A from operation 317) will be included in the package file. Conditions for selecting results from the received set of results are discussed above.

At operation 321, the controller service determines whether the identities of the one or more selected devices (e.g., of operation 307) share the same unique object identity as one or more devices from which another set of test results (e.g., set B, C, . . . n) may be used. In examples, controller service may compare the unique object identifiers associated with the received set of results (e.g., set A) to the unique object identifiers of other sets of results (e.g., set B, C, . . . n) that have been received or are expected to be received. The comparison may determine that some results or all results of the other set of results (e.g., set B, C, . . . n) associated with test objects having the same unique object identifiers. In examples, controller service determines whether test objects are related based on the other sets of results (e.g., set B, C, . . . n) including testing outcomes corresponding to a device group comprising at least one of the selected devices of the request of operation 307. The other set of results (e.g., set B, C, . . . n) may originate from the client system presently requesting verification testing (e.g., client system 121A), other client systems (e.g., 121B and/or 121N), other server systems, a data repository, a database, and/or any other component or combination thereof of the distributed environment.

If at operation 321, controller service determines that none of the results of the other sets results (e.g., set B, C, . . . n) are associated with a test object that is the same (or within a device group) as the set of results (e.g., set A) received in operation 317, then at operation 323, the controller service creates a package file for hardware validation without using any of the other sets of results (e.g., set B, C, . . . n). In examples, the package file may include some or all the results of the received set of results (e.g., set A). The selection of which results of the received set of results (e.g., set A) are included in the package file for hardware validation may be performed manually by a user, automatically by controller service, and/or some combination thereof.

If, however, at operation 321, controller service determines that one or more of the results of the other results (e.g., set B, C, . . . n) are associated with one or more test object that is the same (or within a device group) as the test objects of the set of results (e.g., set A) received in operation 317, then at operation 325, the controller service may select for the package file: some or all of the set of results received in operation 317 (e.g., set A), some or all of the one or more of the results of the other results identified in operation 321 (e.g., set B, C, . . . n), and/or some combination of the set of results received in operation 317 and the one or more of the results of the other results identified in operation 321 (e.g., some combination of sets A, B, C, and/or . . . n). The selection of which results of the received set of results (e.g., set A) are included in the package file for hardware validation may be performed manually by a user, automatically by controller service, and/or some combination thereof. At operation 327, controller service merges selected results from the different sets of results, into a package file for hardware validation.

In examples, method 300 may be performed based at least on one or more devices sharing a similar unique object identity as one or more other device. Further, method 300 may be performed based at least on one or more devices sharing the same or similar unique object identity as one or more other device.

FIG. 4 is an exemplary flow chart illustrating a method 400 of uniquely identifying systems and/or devices. At operation 401, a client node gathers information, for example, about hardware and/or software of one or more client nodes, systems and/or devices of client nodes, systems and/or devices in communication with client nodes, systems and/or devices previously in communication with client nodes, data stored at client nodes, data accessible by client nodes, users of client nodes, and/or the like. Examples of gathered information 207 includes, but is not limited to, HWIDs, PCI information, operating system version or edition, driver information, device feature information, system feature information, one or more set up information files (e.g., INF file), any information associated with one or more set up information files (e.g., driver name, driver location, driver version (or edition) information, registry information, etc.), extension file information (e.g., EXT file), brand support information, family platform information, software identification information, application programming interface (API) information, one or more project identifications, and/or the like.

Additional examples of gathered information 207 includes, but is not limited to, driver information and/or one or more modular extension drivers. For the purposes of this disclosure, drivers disclosed herein are universal in nature, such that a driver is a single code base that installs across multiple operating system (OS) editions. As such, a driver is configured to operate on a variety of platforms (e.g., desktop, laptop, gaming console, smart phone, tablet, IOT devices, smart watch, smart glasses, and the like) and is further configured to function with one or more modular extension drivers that provide platform specific features. Still further examples of gathered information 207 includes, but is not limited to, operating system information and/or one or more modular extension of the operating system. In examples, an operating system is a base operating system configured to operate on a variety of platforms that is further configured to function with one or more modular extensions of the operating system that provide platform specific features.

At operation 402, the client node sends some or all of gathered information 207 via a transceiver in one or more data communications (e.g., data packets) to a remote component (e.g., server node). At operation 403, gathered information is received by a transceiver of one or more server nodes in one or more data communications (e.g., data packets). The gathered information may include information about one or more objects that is sufficiently uniquely descriptive information about an object to adequately create a unique object identity 204 for one or more objects. An object may be a system or device.

An example of uniquely descriptive information of an object is the object's system file. In examples, an object's file system includes the object's driver and hardware configuration as well as system settings and variables for the drivers, which provides for an operating system to communicate with the object. Other examples include object manager information, object settings, object driver or drivers, variables for the object's driver or drivers, a driver of the object, driver extensions of the object, an operating system of the object, one or more modular extensions of the operating system of the object, hardware configurations of the object, the object's set up information, the object's directory, the application programming interface (API) of the object or being used by the object, and/or the like.

At operation 404, the object identifier selects a particular test object for identification. At operation 405, based at least on the received information descriptively representing the selected object, an object identifier creates a unique object identity 204 for the selected test object, for example, by computing a hash on uniquely identifiable information of the selected test object. In examples, the object identifier 250 uses the selected test object's object system file (e.g., device system file) to create the unique object identity 204. Example object system files include the object's driver and hardware configuration as well as system settings and variables for the drivers, which provides for operating system communication with the object. In examples, the object identifier 250 computes a hash on the object's file system. The hash is sufficiently unique to identify the selected test object within a threshold of accuracy, and the hash algorithm may be adjusted as is desired to increase and/or decrease the threshold of accuracy.

At operation 406, the server node stores the unique object identifier in association with the selected test object. In examples, the actual object 208 represented by the test object may store the unique object identity in memory of the object 208. The unique object identity and association to the selected object may be distributed to various components of compatibility testing systems disclosed herein, for example one or more client nodes, server nodes, one or more memories, one or more controller services, one or more validation centers, one or more databases (database 113 and/or 115) and/or data repositories that may be publicly accessible and/or proprietary. The created unique object identities may be identified in one or more tags of compatibility test and/or tags of test results, and the unique object identities may be used as a factor by client services and/or controller services when mapping test sets 211, results 213, test results 232, validation packages 231, and/or the like.

In examples, method 400 may be performed a plurality of times and over the course of time (e.g., weeks, months, years), and many unique object identities may be stored in association with many objects and grow over time. One or more data repositories may store a plurality of unique object identities as associated with the object it identifies. As explained, unique object identities may be created from uniquely identifiable information of objects, for example, a device system file including the object's driver and hardware configuration, system settings, and variables for the drivers, which provides for operating system communication with the object. When the driver package contents of two devices are equal to each other, the two devices are determined to be the same. Objects that are the same are assigned the same unique object identifier. Further, objects that are similar to each other may be assigned unique object identities that are similar to each other. For example, when object identifier computes a hash on two audio devices on different hardware platforms, while the first unique object identity of the first audio device will be unique from second unique object identity of the second audio device based at least on hardware platform difference, the first unique object identity will be similar to second unique object identity due to the devices' shared similarities.

In examples, threshold of similarities, types of similarities, and/or categorizes of similarities of the unique object identities between similar devices may be controlled by adjusting the hash algorithm and/or adding data of interest to be hashed. As a result, unique object identities may be used to create object groups (e.g., device groups). Object groups define a group of similar objects. Object groups may be based on one or more parameters and various thresholds of similarities, for example, threshold similarities of the objects' driver(s), threshold similarities of the objects' driver extensions, threshold similarities of the objects' features and/or functions, threshold similarities of the objects' operating system, threshold similarities of the objects' modular extensions to an operating system, threshold similarities of the objects' hardware and/or software, threshold similarities of the objects' type, and/or other identifiable factors. Objects may be considered similar and part of a defined device group even when running different versions or editions of an operating system. As such, unique object identities may be leveraged by compatibility testing systems and methods to determine similarities between target objects and previously tested objects. The similarities may be governed by dynamic thresholds to counterbalance accuracy and scalability as is desired for a particular testing project. Higher similarity thresholds make an object group smaller and includes objects that are highly similar to each other. Lower similarity thresholds make an object group larger and includes objects that are more diverse from each other. In examples, an overall threshold similarity of devices may be determined by summing values of one or more of the example threshold similarities described above. Further, threshold similarity values may be weighted (by user input and/or by the controller service) such that a determined importance of various threshold similarities influence effect an overall threshold similar of devices. Determining the relative importance of one or more threshold similarities may be defined by a user, determined by controller service based on historical and/or heuristic data gathered by the system, Based on the determined thresholds of similarities, a controller service may map multiple similar devices to a single test, if the test is tagged as being so distributable.

Further, unique object identities may be used to identify objects of platform families. For example, when a new object of an existing platform family is developed, the new object's unique object identity is computed and used to determine that the new object is a member of an existing platform family. The scalability of compatibility testing systems and methods are improved by determining that a new object is a member of an existing platform family that has already successfully passed testing validation procedures, thereby safely allowing for a reduction in the amount of testing performed on the new object. In an example, controller service 215 identifies the new test object as being a target object using at least the test object's unique object identity. Further, controller service 215 identifies an existing platform family to which the target object belongs based at least on the target object's unique object identity having similarities with the existing platform. Controller service 215 may determine which target objects of the existing platform family have already passed compatibility testing, and controller service 215 may choose not to map some of the compatibility tests from the test set 211 based on some or of the target objects of the existing platform family having already passed compatibility testing. Such omissions further reduce testing redundancy. Further still, if the new target object's unique object identity indicates that the new target object should be or is part of an object group that has already passed compatibility testing, controller service 215 may utilize test results of the object group and bypass some or all testing of the new target object. Because the new target object is similar enough to belong to the group, the validation testing system may safely assume that the new target object is compatible based on the similarities alone, without having to separately test the new target object. Further still, if the new test object shares the same unique object identifier as a previously tested object that already passed validation testing, controller service 215 may utilize test results of the previously tested object sharing the same unique object identity and bypass some or all testing of the new target object.

Figure 5:
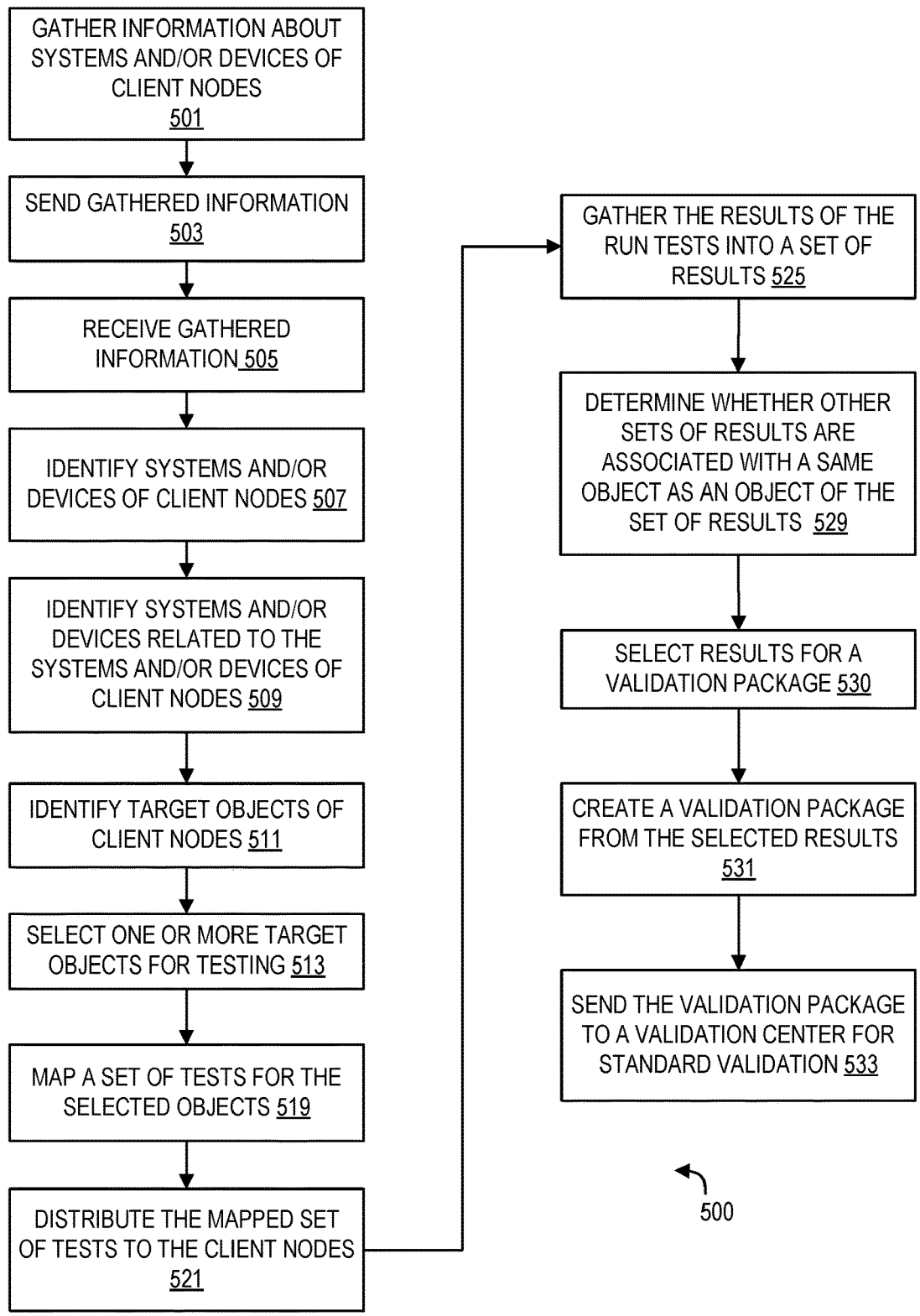
FIG. 5 is an exemplary flow chart illustrating a method of testing the compatibility of systems and/or objects for a specific operating standard.

FIG. 5 is an exemplary flow chart illustrating a method 500 of testing the compatibility of systems and/or objects for one or more specific operating standard or compatibility. FIG. 5 is an exemplary flow chart illustrating a method 500 of testing the compatibility of systems and/or objects for a specific operating standard. In examples, operation 501 gathers information about systems and/or devices of one or more client nodes. At operation 503, the gathered information is sent to a server node. In operation 505, a server node receives the gathered information. At operation 507, the server node uses the gathered information to identify systems and/or devices of the one or more client nodes. At operation 509, the server node uses some or all of the othered information, as well as additional information available to the server node, to identify additional systems and/or devices that are related to the identified systems and/or devices of one or more client nodes. These related systems and/or devices may not be located at the one or more client nodes. Identifying these related systems and/or devices may become useful at a later operation of the method.

At operation 511, the server node determines which of the identified systems and/or devices of the one or more client nodes are target objects and may indicate as such on the GUI. A server node may identify a system and/or device as being a target object when the server node determines that one or more tests are available to test the compatibility of the system and/or device. At operation 513, a server node selects one or more test objects based on the identified target objects. When a target object is selected for testing, that target object may be known as a test object.

In operation 519, based at least on the selected test objects, the server node maps a set of tests for the test objects of the one or more client nodes. In examples, the server node may use information about the related systems and/or devices identified in operation 509 when mapping the set of tests.

In operation 521, the server node distributes the mapped set of tests to the one or more client nodes. The client nodes execute the set of tests based on the mapping. In examples, tests may be sent sequentially, such that a test (or group of tests) is sent to and executed by the one or more client nodes, thereupon a next test (or group of tests) is sequentially sent to and executed by the one or more client nodes, and so on. In another example, tests of a set of tests may be sent to the one or more client nodes in one or more groups, wherein the set of tests includes execution instructions indicating an order of testing. At operation 525, the results of the run tests are gathered into a set of results (e.g., set A). At operation 529, the server node determines whether one or more other sets of results (e.g., set B, C . . . N) are associated with one or more test objects that are the same as one or more test objects associated with the other sets of results (e.g., set B, C . . . N). When one or more test objects associated with the one or more other sets of results (e.g., set B, C . . . N) have the same unique object identifier, the one or more test objects will be considered the same. If it is determined that one or more test objects associate with other sets of results (e.g., set B, C . . . N) are the same as one or more test objects of the set of results (e.g., set A), these one or more other sets of results (e.g., set B, C . . . N) may be used in lieu of one or more tests of the set of results (e.g., set A), to supplement one or more tests of the set of results (e.g., set A), or not at all, while the method selects results for a validation package. In examples, at least unique object identities are used to determine whether or merge some or all of the set of results with some or all other sets of results. In this manner, testing may be performed on a subset of devices, rather than every device.

At operation 530, based at least on one or more identities of the tested objects (e.g., unique device identities'), the server node selects one or more results from the set of results (e.g., set A), for a validation package. If other sets of results (e.g., set B, C . . . N) are among the sets of results from which results are selected for a validation package, the server node may select one or more results from the other sets of results (e.g., set B, C . . . N) and merge these additionally selected results with results selected from one or more results (e.g., set A) for the validation package. In examples, the selection may be manual, automatic, and/or a combination of the above. At operation 531, the server node creates a validation package from the selected and/or merged results. In operation 533, the validation package is sent to a validation center for validation, for example, against an operating standard, hardware standard, device standard, co-engineering hardware and/or software, and/or the like.

In examples, method 500 may be performed based at least on one or more devices sharing a similar unique object identity as one or more other device. Further, method 500 may be performed based at least on one or more devices sharing the same or similar unique object identity as one or more other device.

Additional Example Scenarios

Aspects of the disclosure enable various additional scenarios, such as next described. In examples, systems and methods determine whether systems and/or devices are related to each other (e.g., family systems and/or devices, vertical systems and/or devices, extension systems and/or devices, non-desktop-based devices, mobile devices, embedded devices), using gathered information, for example, driver(s), extensions of driver(s), operating system(s), extensions of operating system(s), and/or modules of operating system(s).

In more detail, a controller service may gather information about a device on a given computer system by obtaining the device's SYS file, which includes device manager information of the device. In examples, a SYS file houses system settings and variables for drivers. An object identifying controller may compute a hash on the SYS file. In examples, the controller service also obtains the path to the computer system's INF via a driverstore API and/or acquires similar information by constructing a hardcoded path to the INF directory on the computer system. The object identifying controller may compute a hash on the INF file. In examples, the controller service correlates the SYS file hash and the INF file hash to the device thereby providing a unique device identity that identifies the device on the computer system.

In one example, a controller service gathers information about a device being identified, for example by enumerating base SYS, base INF, and extension INF information using an API. In examples, the controller service may ignore an INF for inbox drivers when the object being identified lacks an INF folder. The controller service may query for ISV drivers of the object being identified. The controller service may aggregate dependent components in the INF sections and computes a hash for the base driver INF and extension INF of the device being identified. An object identifying controller computes a hash for individual dependencies. The controller service may then update infra code updating the API, which supports the update of the controlling service infra code. In examples, the infra code is updated for internal use. In examples, the controller service determines whether the device could be a member of a target family. For example, by verifying the data properties (manufacturer, driver hash, INF hash, bus/enumerator, class/subclass) of the computer system and the device are similar.

In an example, target similarity may be determined using DriverStore file hashes. In examples, two targets will be considered identical across core package compositions if the hashes of the DriverStore associated with the same hardware under test are identical. The compatibility testing infrastructure may gather do-not-enumerate DriverStore files unless the APIs it currently uses explicitly return paths in DriverStore locations. Additionally, the compatibility testing infrastructure may retain legacy behavior drivers in instances where the non-driverstore files are used to compute driver similarity. In some examples, driver files that are used to compute the inf/driver file locations for some projects from the legacy locations are tagged as being enumerated by the current algorithm. Driver files that enumerated from the driverstore are tagged as coming from the DriverStore. Some DriverStore locations are returned from legacy APIs as well (e.g., in these scenarios the files are tagged as being found from both sources). A helper function enumerates each .inf file.

Exemplary Operating Environment

Figure 6:
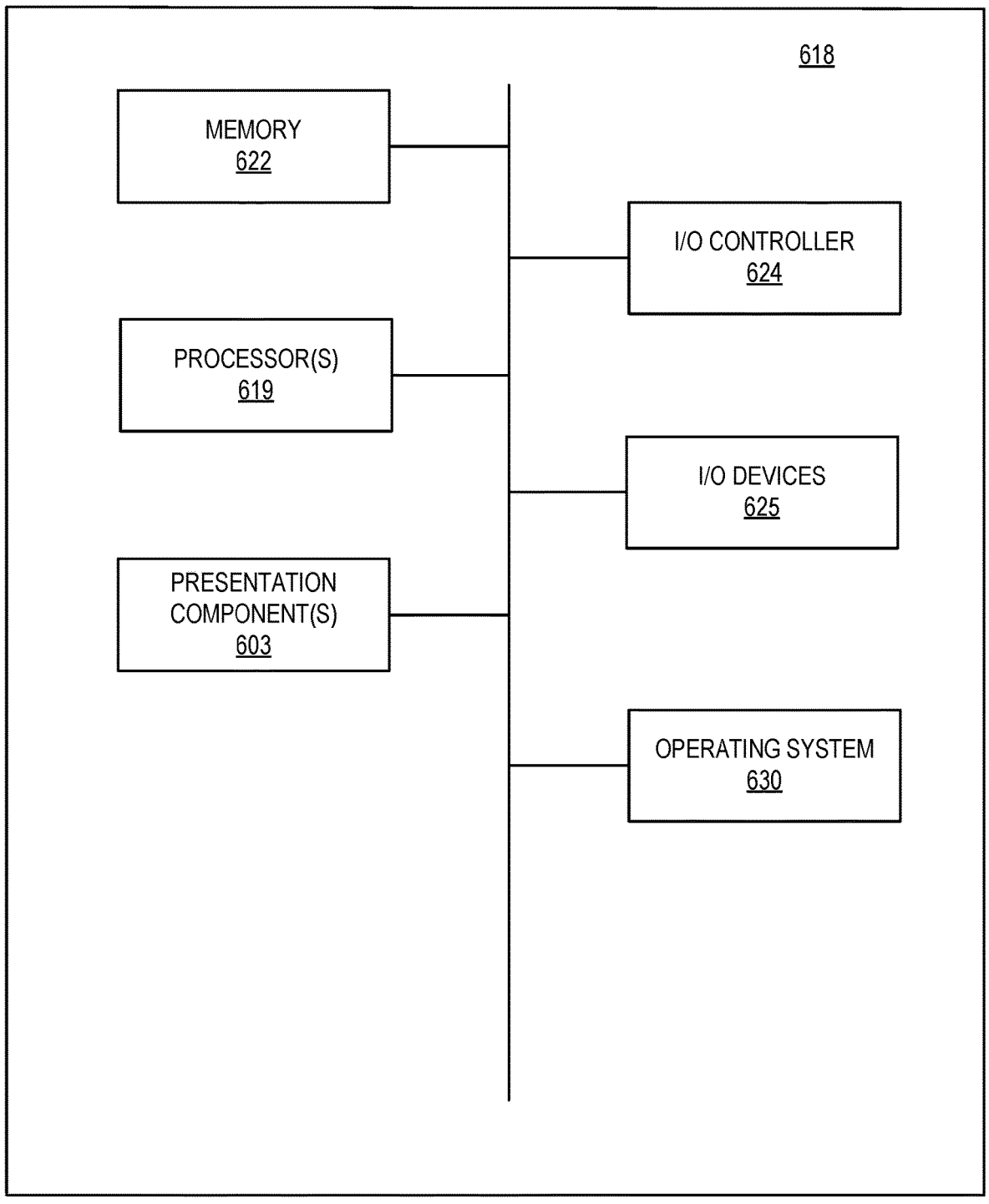
FIG. 6 illustrates a computing apparatus according to an example as a functional block diagram.

The present disclosure is operable with a computing apparatus according to an example as a functional block diagram 600 in FIG. 6. In an example, components of a computing apparatus 618 may be implemented as a part of an electronic device according to examples described in this specification. The computing apparatus 618 comprises one or more processors 619 which may be microprocessors, controllers or any other suitable type of processors for processing computer executable instructions to control the operation of the electronic device. Alternatively, or in addition, the processor 619 is any technology capable of executing logic or instructions, such as a hardcoded machine. Platform software comprising an operating system 630 or any other suitable platform software may be provided on the apparatus 618 to enable application software to be executed on the device. According to an example, controller service software gathering information about devices, sending information about the devices and access to a GUI displaying a list of target objects on presentation components 603 (e.g., a display). Presenting a list of target devices on a GUI, which receives user input regarding the selection of target objects for testing, as described herein may be accomplished by software.

Computer executable instructions may be provided using any computer-readable media that are accessible by the computing apparatus 618. Computer-readable media may include, for example, computer storage media such as a memory 622 and communications media. Computer storage media, such as a memory 622, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 622) is shown within the computing apparatus 618, it will be appreciated by a person skilled in the art, that the storage may be distributed or located remotely and accessed via a network or other communication link (e.g. using a communication interface 623).

The computing apparatus 618 may comprise an input/output controller 624 configured to output information to one or more output devices 625, for example a display or a speaker, which may be separate from or integral to the electronic device. The input/output controller 624 may also be configured to receive and process an input from one or more input devices 626, for example, a keyboard, a microphone or a touchpad. In one example, the output device 625 may also act as the input device. An example of such a device may be a touch sensitive display. The input/output controller 624 may also output data to devices other than the output device, e.g. a locally connected printing device. In some examples, a user may provide input to the input device(s) 626 and/or receive output from the output device(s) 625.

The functionality described herein can be performed, at least in part, by one or more hardware logic components. According to an example, the computing apparatus 618 is configured by the program code when executed by the processor 619 to execute the examples of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

Examples herein provide systems for compatibility testing. An example system includes one or more memories that store a plurality of compatibility tests, wherein a compatibility test includes a tag indicating devices that correspond to the compatibility test. Example systems also include one or more processors coupled to the one or more memories that is configured to receive information describing one or more devices of a client system. Based on at least some of the information, an example processor may identify one or more devices of the client system, wherein a device is identified via a unique object identity. Based on the unique object identities of the identified devices, an example processor may determine which of the identified devices are part of device groups. In examples, a device group comprises devices having a defined threshold of similarities. In examples, based on the determination, the processor selects one or more devices of the identified devices for testing and in response to the selection, maps a set of tests from a plurality of compatibility tests. A compatibility test is mapped in the set of tests, for distribution to the client system, based at least on the compatibility test indicating correspondence with at least one of the selected devices, or the compatibility test indicating correspondence with a device group comprising at least one of the selected devices. The system may distribute the set of tests to the client system. In examples, a compatibility test is included in the set of tests based at least on the compatibility test having a tag indicating correspondence with at least one of the selected devices or the compatibility test having a tag indicating correspondence with a device group comprising at least one of the selected devices. Example processors receive, from the client system, a set of results based on outcomes of the set of tests. In examples, the set of results lacks testing outcomes associated with one or more of the selected devices that are included within a device group. A processor may verify that the set of results are related to one or more other sets of results, based on the other sets of results including one or more testing outcomes corresponding to the device group comprising at least one of the selected devices. In examples, an included testing outcome is an outcome from a device of the device group that is a different device as compared to the selected device of the device group. Based on the verification, a processor may select results from the set of results and select other results from the other sets of results and merge the selected results and the selected other results into a package file for hardware certification.

Example methods of performing compatibility testing in a distributed environment are discussed herein. In examples, a server receives from a client system information describing devices of a client system. Based on at least some of the information, devices the client system are identified via a unique object identity. In examples, based on the unique object identities of the identified devices, a server determines which of the identified devices are part of device groups. In examples, a device group comprises devices having a defined threshold of similarities. A server may select devices of the identified devices for testing, and in response to the selection, the server may map a set of tests from the plurality of compatibility tests. In examples, a compatibility test is included in the set of tests based at least on the compatibility test having a tag indicating correspondence with at least one of the selected devices or the compatibility test having a tag indicating correspondence with a device group comprising at least one of the selected devices. After the client system executes set of tests. The server receives, from the client system, a set of results based on outcomes of the set of tests, wherein the set of results lacks testing outcomes associated with one or more of the selected devices that are included within a device group. The server also verifies that the set of results are related to other sets of results, based on the other sets of results including testing outcomes corresponding to the device group comprising at least one of the selected devices. In examples, an included testing outcome is an outcome from a device of the device group that is a different device as compared to the selected device of the device group. Based on the verification, the server selects results from the set of results and selecting other results from the other sets of results and merges the selected results and the selected other results into a package file for hardware certification.

In another example, one or more computer storage devices having computer-executable instructions, which upon execution by a computer cause the computer to perform operations. An example operation includes receiving, by a server from a client system, information describing devices of a client system. Based on at least some of the information, operations identify devices of the client system, wherein a device is identified via a unique object identity. Further, based on the unique object identities of the identified devices, an example operation determines which of the identified devices are part of device groups, wherein a device group comprises devices having a defined threshold of similarities. In examples, one or more devices of the identified devices are selected for testing, and in response to the selection, operations map a set of tests from the plurality of compatibility test. In examples, a compatibility test is mapped in the set of tests based at least on the compatibility test having a tag indicating correspondence with at least one of the selected devices or the compatibility test having a tag indicating correspondence with a device group comprising at least one of the selected devices. An example operation receives, from the client system, a set of results based on outcomes of the set of tests, wherein the set of results lacks testing outcomes associated with one or more of the selected devices that are included within a device group. Further, the operations verify that the set of results are related to other sets of results, based on the other sets of results including testing outcomes corresponding to the device group comprising at least one of the selected devices, wherein an included testing outcome is an outcome from a device of the device group that is a different device as compared to the selected device of the device group. Based on the verification, operations perform selecting results from the set of results and selecting other results from the other sets of results; and merging the selected results and the selected other results into a package file for hardware certification.

Alternatively, or in addition to the other examples described herein, examples include any combination of the following:
  wherein the one or more processors coupled to the one or more memories that are further configured to: receive, from the client system, a set of results based on the execution of the set of tests; determine whether one or more results of the received set of results indicate a first device identified by an object identity that is similar, within a threshold of similarity, to an object identity of another device tested according to a different set of tests; based on a determination that the object identity of the first device is similar to the object identity of the another device: select one or more results of the first set of results, select one or more results of a different set of results based on the another device, and merge the selected results into a package file; or based on a determination that the object identity of the first device is outside the threshold of similarity as compared to the object identity of the another device, create a package file without the results of a different set of results.
  wherein the object identity of the first device is determined to be similar to the object identity of the another device when the object identity of the first device is the same as the object identity of the another device.

wherein an object identity is created based on a driver of the device and driver extensions of the device.

wherein the object identity is identified independent of a hardware identifier (HWID) or a peripheral component interconnection (PCI).

wherein the threshold of similarity is defined such that object identity of the another device except that the different object identity indicates that the first device and the another device on a common operation system having a different version or edition.

wherein the one or more processors are further configured to: determine that a second client system is similar to the client system, receive information describing one or more devices of the second client system, based on at least some of the received information, determine an object identifier of at least one device of the second client system, based on the determined object identifier, select the at least one second device of the second client system for compatibility testing, in response to the selection, map the set of tests from the plurality of compatibility tests based on one or more of the compatibility tests identifying the at least one second selected device, and distribute the set of tests to the second client system for execution by a device thereof.

matching the one or more compatibility tests to the identified one or more devices based on tags of the one or more compatibility tests, wherein a tag indicates devices for which a compatibility test is designed.

matching the one or more compatibility tests to the identified one or more devices based on tags of the one or more compatibility tests, wherein a tag indicates devices for which a compatibility test is designed.

wherein the set of tests includes one or more compatibility tests for a plurality of client systems.

wherein the mapped set of tests includes the one or more compatibility tests for one or more additional devices based on a determination that compatibility testing of the at least one selected device affects the one or more additional devices.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one example or may relate to several examples. The examples are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for compatibility testing, the system comprising:
    one or more memories that store a plurality of compatibility tests, the plurality of compatibility tests indicating devices that correspond thereto; and
    one or more processors, coupled to the one or more memories, that are configured to execute computer-executable instructions to:
        receive, by a server from a client system, information describing devices of the client system;
        based on at least a portion of the received information, identify one or more devices of the client system, wherein a device is identified via an object identity;
        based on the object identity of each of the identified one or more devices, determine which of the identified one or more devices are part of a device group of one or more device groups, wherein the device group comprises devices having a threshold of similarities;
        based on the determination, select one or more devices of the identified one or more devices for testing;
        in response to the selection, map a set of tests from a plurality of compatibility tests for distribution to the client system;
        distribute the set of tests to the client system;
        receive, from the client system, a set of results based on outcomes of the set of tests, wherein the set of results lacks testing outcomes associated with one or more of the selected one or more devices that are included within the device group;
        select results from the set of results, and select other results from one or more other sets of results including testing outcomes from a device of the device group that is different compared to the selected one or more devices; and
        merge the selected results and the selected other results into a package file for hardware validation.

2. The system of claim 1, wherein the instructions further comprise mapping the object identity of each of the identified one or more devices based on a driver of each of the one or more identified devices and driver extensions of each of the identified one or more devices.

3. The system of claim 1, wherein the object identity of each of the identified one or more devices is identified independent of peripheral component interconnection (PCI) data.

4. The system of claim 1, wherein the one or more processors are configured to execute computer-executable instructions to map the set of tests from the plurality of compatibility tests based on at least one of:
 a compatibility test indicating correspondence with at least one of the selected one or more devices, or
 the compatibility test indicating correspondence with the device group, the device group comprising at least one of the selected one or more devices.

5. The system of claim 1, wherein the one or more processors are configured to execute computer-executable instructions to select results from the set of results and select other results from one or more other sets of results based at least in part on verifying that the set of results are related to the one or more other sets of results, based on the one or more other sets of results including the testing outcomes from the device that is different compared to the selected one or more devices of the one or more identified devices.

6. A method of compatibility testing in a distributed environment, the method comprising:
 receiving information describing one or more devices of a client system;
 based on at least some of the received information, determining an object identifier of at least one device of the client system;
 based on the determined object identifier, selecting the at least one device of the client system for compatibility testing;
 in response to the selection, mapping a set of tests from a plurality of compatibility tests based on one or more of the compatibility tests identifying the selected at least one device;
 distributing the set of tests to the client system for execution by or against a device thereof;
 receiving, from the client system, a first set of results based on the execution of the set of tests;
 determining that one or more results of the received first set of results indicate a first device identified by an object identity that is similar, within a threshold of similarity, to an object identity of a second device tested according to a different set of tests;
 selecting one or more results from the first set of results and from a different set of results based on the second device; and
 merging the selected one or more results into a package file for hardware validation.

7. The method of claim 6, wherein the object identity of the first device is determined to be similar to the object identity of the second device upon the object identity of the first device being the same as the object identity of the second device.

8. The method of claim 6, wherein the object identity of the first device is mapped based on a driver of the first device and driver extensions of the first device.

9. The method of claim 6, wherein mapping the set of tests comprises:
 matching the plurality of compatibility tests to the selected at least one device based on tags included with the plurality of compatibility tests, wherein the tags indicate devices for which a compatibility test is designed.

10. The method of claim 6, further comprising:
 determining that a second client system is similar to the client system;
 receiving information describing one or more devices of the second client system;
 based on at least some of the received information, determining an object identifier of at least one device of the second client system;
 based on the determined object identifier, selecting at least one second device of the second client system for compatibility testing;
 in response to the selection, mapping the set of tests from the plurality of compatibility tests based on one or more of the compatibility tests identifying the selected at least one second device; and
 distributing the set of tests to the second client system for execution by or against a device thereof.

11. The method of claim 6, wherein the mapped set of tests includes one or more compatibility tests for one or more devices of a plurality of client systems.

12. The method of claim 6, wherein the mapped set of tests includes the one or more compatibility tests for one or more additional devices based on a determination that compatibility testing of the selected at least one device affects the one or more additional devices.

13. One or more computer storage media having computer-executable instructions, which upon execution by a computer cause the computer to perform operations comprising:
 receiving information describing one or more devices of a client system;
 based on at least some of the received information, determining an object identifier of at least one device of the client system;
 based on the determined object identifier, selecting the at least one device of the client system for compatibility testing;
 in response to the selection, mapping a set of tests from a plurality of compatibility tests based on one or more of the compatibility tests identifying the selected at least one device;
 distributing the set of tests to the client system for execution by a device thereof;
 receiving, from the client system, a first set of results based on the execution of the set of tests;
 determining that one or more results of the received first set of results indicate a first device identified by an object identity that is similar, within a threshold of similarity, to an object identity of a second device previously tested;
 selecting one or more results from the first set of results and from a different set of results based on the second device; and
 merging the selected one or more results into a package file for hardware validation.

14. The computer storage media of claim 13, wherein the object identity of the first device is determined to be similar to the object identity of the second device upon the object identity of the first device being the same as the object identity of the second device.

15. The computer storage media of claim 13, wherein the object identity of the first device is within the threshold of similarity to the object identity of the second device upon the first device and the second device executing different versions or editions of an operating system.

16. The computer storage media of claim 13, wherein an object identity is created based on a driver of the first device.

17. The computer storage media of claim 13, wherein an object identity is created based on a driver extension of the first device.

18. The computer storage media of claim 13, wherein the object identity of the first device is identified independent of a hardware identifier (HWID).

19. The computer storage media of claim 13, wherein the operations further comprise:
- determining that a second client system is similar to the client system;
- receiving information describing one or more devices of the second client system;
- based on at least some of the received information, determining an object identifier of at least one device of the second client system;
- based on the determined object identifier, selecting at least one second device of the second client system for compatibility testing;
- in response to the selection, mapping the set of tests from the plurality of compatibility tests based on one or more of the compatibility tests identifying the selected at least one second device; and
- distributing the set of tests to the second client system for execution by a device thereof.

20. The computer storage media of claim 13, wherein the mapped set of tests includes one or more compatibility tests for one or more devices of a plurality of client systems.

* * * * *